(12) United States Patent
Gao

(10) Patent No.: US 11,029,581 B2
(45) Date of Patent: Jun. 8, 2021

(54) CAMERA LENS

(71) Applicant: AAC Optics Solutions Pte. Ltd., Singapore (SG)

(72) Inventor: Yuchan Gao, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 16/708,440

(22) Filed: Dec. 10, 2019

(65) Prior Publication Data

US 2020/0209718 A1    Jul. 2, 2020

(30) Foreign Application Priority Data

Dec. 26, 2018    (CN) .......................... 201822208438.5

(51) Int. Cl.
| | | |
|---|---|---|
| *G03B 17/12* | (2021.01) | |
| *G02B 7/08* | (2021.01) | |
| *G02B 13/00* | (2006.01) | |
| *G03B 3/10* | (2021.01) | |
| *H04N 5/225* | (2006.01) | |

(52) U.S. Cl.
CPC ............... *G03B 17/12* (2013.01); *G02B 7/08* (2013.01); *G02B 13/001* (2013.01); *G03B 3/10* (2013.01); *H04N 5/2254* (2013.01)

(58) Field of Classification Search
None
See application file for complete search history.

(56) References Cited

U.S. PATENT DOCUMENTS

| | | | | |
|---|---|---|---|---|
| 2010/0157142 A1* | 6/2010 | Ryu | ..................... | H04N 5/2254 |
| | | | | 348/373 |
| 2016/0223776 A1* | 8/2016 | Choi | ..................... | G02B 7/023 |
| 2017/0299839 A1* | 10/2017 | Weng | ..................... | G02B 7/021 |
| 2017/0353638 A1* | 12/2017 | Konttori | ................ | G03B 11/04 |
| 2020/0209718 A1* | 7/2020 | Gao | ..................... | G02B 13/004 |

FOREIGN PATENT DOCUMENTS

| | | |
|---|---|---|
| CN | 101571618 A1 | 11/2009 |
| CN | 206339747 B1 | 7/2017 |
| CN | 206339774 B1 | 7/2017 |
| CN | 209525507 B1 | 10/2019 |
| CN | 209525517 B1 | 10/2019 |
| JP | 1987247311 A1 | 10/1987 |
| JP | 425455 A1 | 10/1993 |
| JP | 2006337763 A1 | 12/2006 |
| JP | 2007316302 A1 | 12/2007 |
| JP | 2008185772 B2 | 8/2008 |
| JP | 2010256599 A1 | 11/2010 |

OTHER PUBLICATIONS

PCT search report dated Jan. 16, 2020 by SIPO in related PCT Patent Application No. PCT/CN2019/113471(5 Pages).

* cited by examiner

*Primary Examiner* — William B Perkey
(74) *Attorney, Agent, or Firm* — W&G Law Group LLP

(57) ABSTRACT

The present invention provides a camera lens, which includes a lens barrel and a lens group accommodated in the lens barrel, wherein the lens group includes a first lens, an inner side wall of the lens barrel is provided with a first magnetic adsorption member, and an outer side wall of the first lens is provided with a second magnetic adsorption member magnetically adsorbed with the first magnetic adsorption member.

10 Claims, 3 Drawing Sheets

CAMERA LENS

TECHNICAL FIELD

The present invention relates to the held of optical imaging technologies, and more particularly, to a camera lens.

BACKGROUND

In recent years, with the development of imaging technologies and the rise of electronic products with imaging function, photographing and shooting functions have gradually become the basic configuration of handheld communication devices such as mobile phones, personal digital assistants and notebook computers. Since image reading modules used by these handheld communication devices need to have miniaturization function, how to make optical lenses of the image reading module have both miniaturization and excellent optical performance has become an important research topic.

In available technology, a camera lens includes a lens barrel with an accommodating space and a plurality of lenses accommodated in the accommodating space, wherein the plurality of lenses are assembled together in a stacked manner, and the lenses are limited in the lens barrel through a pressing ring glued on an inner wall of the lens barrel. However, the camera lens assembled in this manner has a relatively large outline dimension and cannot meet the market demand for miniaturization.

Therefore, it is necessary to provide a camera lens to solve the problem of larger outline dimension of the available camera lens.

In the figures: 1 refers to camera lens; 10 refers to lens barrel; 11 refers to first annular recess; 20 refers to lens group; 21 refers to first lens; 211 refers to first optical portion; 212 refers to first fixing portion; 22 refers to second lens; 221 refers to second optical portion; 222 refers to second fixing portion; 23 refers to third lens; 231 refers to third optical portion; 232 refers to third fixing portion; 24 refers to fourth lens; 241 refers to fourth optical portion; 242 refers to fourth fixing portion; 30 refers to first magnetic adsorption member; 40 refers to second magnetic adsorption member; 50 refers to third magnetic adsorption member; 60 refers to fourth magnetic adsorption member; 70 refers to fifth magnetic adsorption member; 80 refers to sixth magnetic adsorption member; 90 refers to seventh magnetic adsorption member; and 100 refers to eighth magnetic adsorption member.

DETAILED DESCRIPTION

The present invention is further explained hereinafter with reference to the drawings and embodiments.

First Embodiment

Figure 1:
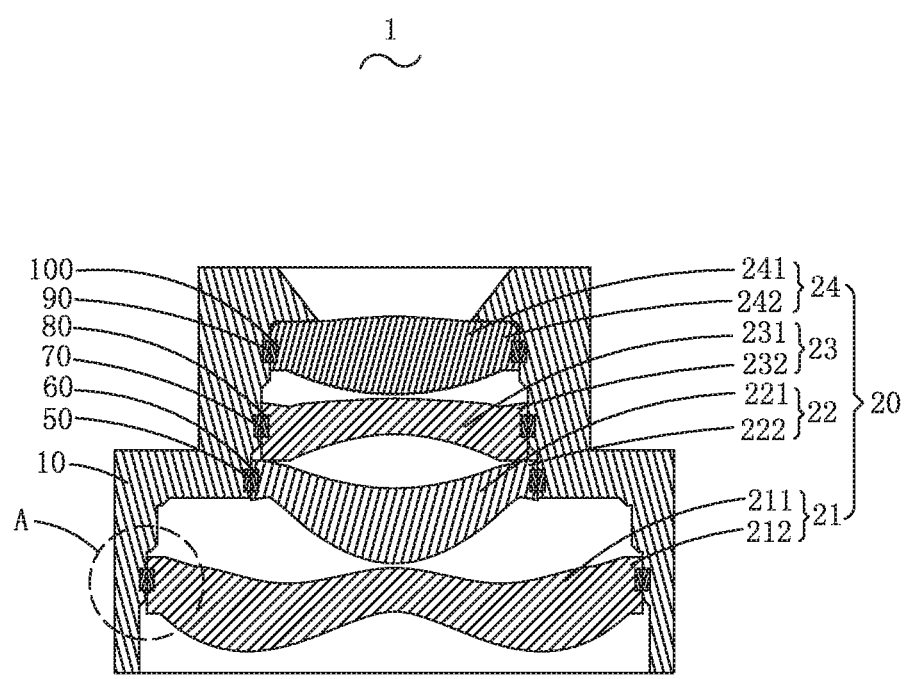
FIG. 1 is a main sectional view of a camera lens provided by an embodiment of the present invention.
Figure 2:
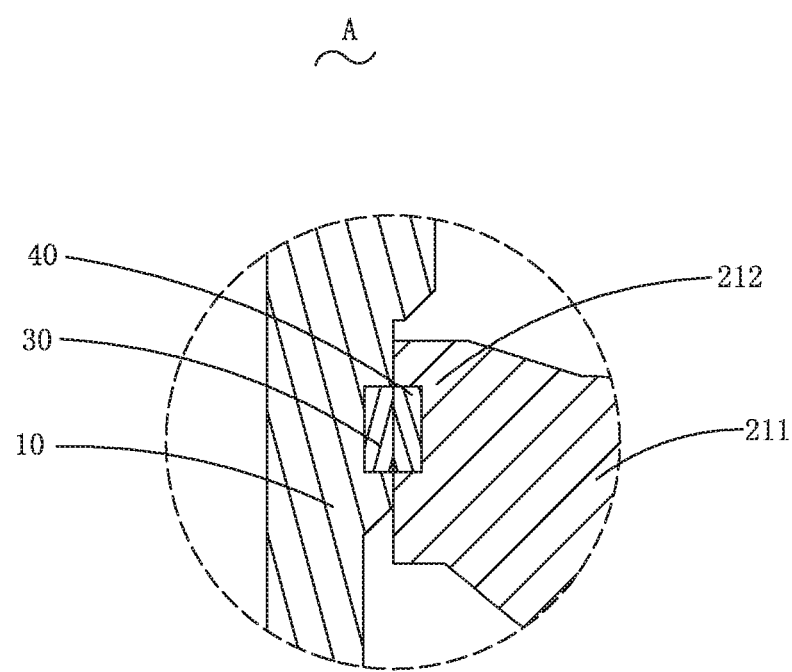
FIG. 2 is a partial enlarged drawing of a portion A in FIG. 1.
Figure 3:
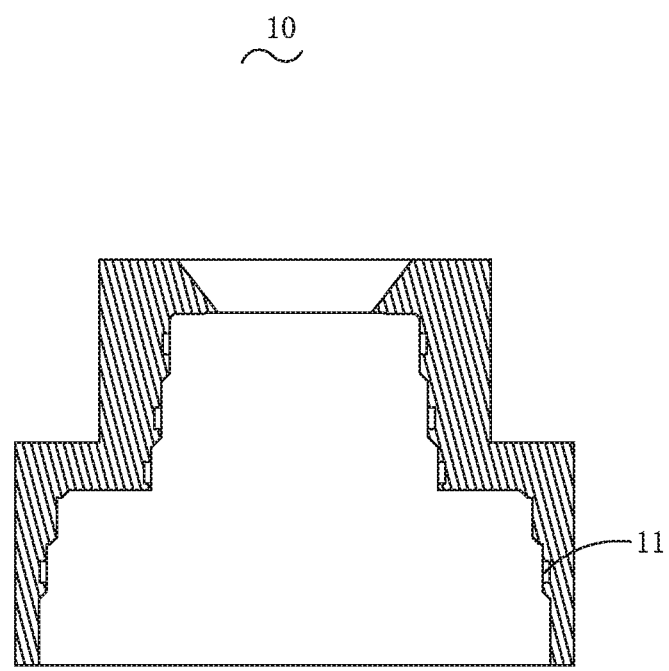
FIG. 3 is a main sectional view of a lens barrel.

Referring to FIGS. 1 to 3, the first embodiment of the present invention provides a camera lens 1. The camera lens 1 includes a lens barrel 10 and a lens group 20 accommodated in the lens barrel 10. The lens group 20 includes a first lens 21. The first lens 21 includes a first optical portion 211 and a first fixing portion 212 arranged on a periphery of the first optical portion 211. An inner side wall of the lens barrel 10 is provided with a first magnetic adsorption member 30, and an outer side wall of the first fixing portion 212 is provided with a second magnetic adsorption member 40 magnetically adsorbed with the first magnetic adsorption member 30. In this way, by this design manner, the first lens 21 may be fixed by magnetic adsorption of the first magnetic adsorption member 30 and the second magnetic adsorption member 40, when assembling the first lens 21 into the lens barrel 10, so that the stability of the camera lens 1 after assembly is good, and the reliability of the camera lens 1 is improved. Moreover, the camera lens 1 adopting this design manner has low requirement on the roundness of an outer diameter of the first lens 21, which greatly reduces the difficulty of injection molding of each member in the camera lens 1, enables the outer dimension of the first lens 21 to be smaller, effectively reduces the radial dimension and volume of the first lens 21, is beneficial for improving a screen-to-body ratio of an electronic device, and reduces a volume of the electronic device. Specifically, one of the first magnetic adsorption member 30 and the second magnetic adsorption member 40 is a magnet, and the other is a magnet or a metal member that can be magnetically adsorbed with the magnet.

Preferably, the first magnetic adsorption member 30 is an annular member annularly arranged on the inner side wall of the lens barrel 10, the second magnetic adsorption member 40 is an annular member annularly arranged on the outer side wall of the first lens 21, the inner side wall of the lens barrel 10 is provided with a first annular recess 11, the first magnetic adsorption member 30 is embedded in the first annular recess 11, the outer side wall of the first lens 21 is concavely provided with a second annular recess, and the second magnetic adsorption member 40 is embedded in the second annular recess, so that collision between the first magnetic adsorption member 30 and the second magnetic adsorption member 40 can be avoided in the assembly process of the first lens 21.

In this embodiment, since the first s 21 and the lens barrel 10 are fixed by magnetic adsorption, the first lens 21 does not need too many first fixing portions 212. Therefore, in this embodiment, the first fixing portion 212 may be partially cut off as required to reduce the dimension of the first lens 21 in the radial direction, so that the volume of the camera lens 1 can be made smaller.

Second Embodiment

The camera lens 1 provided in this embodiment is different from the camera lens 1 provided in the first embodiment in the setting manner of the first magnetic adsorption member 30. Specifically: in this embodiment, the first magnetic adsorption member 30 includes a plurality of first magnetic blocks arranged at intervals on the outer side wall of the lens along a circumferential direction, while the second magnetic adsorption member 40 is an annular member annularly arranged on the outer side wall of the first lens 21.

Preferably, the inner side wall of the lens barrel 10 is provided with a plurality of first recesses arranged at intervals along the circumferential direction, each first recess is embedded with one of the first magnetic blocks, the outer side wall of the first lens 21 is concavely provided with a second annular recesses, and the second magnetic adsorption member 40 is embedded in the second annular recess.

Third Embodiment

The camera lens 1 provided in this embodiment is different from the camera lens 1 provided in the first embodiment in the setting manner of the second magnetic adsorption member 40. Specifically: in this embodiment, the second magnetic adsorption member 40 includes a plurality of second magnetic blocks arranged at intervals on the outer side wall of the first lens 21 along a circumferential direction, while the first magnetic adsorption member 30 is an annular member annularly arranged on the inner side wall of the lens barrel 10.

Preferably, the inner side wall of the lens barrel 10 is provided with a first annular recess 11, the first magnetic adsorption member 30 is embedded in the first annular recess 11, the outer side wall of the first lens 21 is provided with a plurality of second recesses arranged at intervals along the circumferential direction, and each second recess is embedded with one of the second magnetic blocks.

Fourth Embodiment

The camera lens 1 provided in this embodiment is different from the camera lens 1 provided in the first embodiment in the setting manner of the first magnetic adsorption member 30 and the second magnetic adsorption member 40. Specifically: in this embodiment, the first magnetic adsorption member 30 includes a plurality of first magnetic blocks arranged at intervals on the inner side wall of the lens barrel 10 along a circumferential direction, while the second magnetic adsorption member 40 includes a plurality of second magnetic blocks arranged at intervals on the outer side wall of the first lens 21 along the circumferential direction.

Preferably, the inner side wall of the lens barrel 10 is provided with a plurality of first recesses arranged at intervals along the circumferential direction, each first recess is embedded with one of the first magnetic blocks, the outer side wall of the first lens 21 is provided with a plurality of second recesses arranged at intervals along the circumferential direction, and each second recess is embedded with one of the second magnetic blocks.

Preferably, the lens group 20 in the first to fourth embodiments described above further includes a second lens 22, a third lens 23 and a fourth lens 24. The first lens 21, the second lens 22, the third lens 23 and the fourth lens 24 are stacked in sequence from an image side to an object side. The second lens 22, the third lens 23 and the fourth lens 24 are all arranged in the lens barrel 10. The second lens 22 includes a second optical portion 221 and a second optical portion 222 arranged on a periphery of the second optical portion 221. The third lens 23 includes a third optical portion 231 and a third fixing portion 232 arranged on a periphery of the third optical portion 231. The fourth lens 24 includes a fourth optical portion 241 and a fourth fixing portion 242 arranged on a periphery of the fourth optical portion 241. The connection manner of the second lens 22, the third lens 23, and the fourth lens 24 to the lens barrel 10 can be correspondingly optimized according to the connection manner of the first lens 21 and the lens barrel 10 in the first to fourth embodiments described above.

Specifically, the inner side wall of the lens barrel 10 is further provided with a third magnetic adsorption member 50 spaced apart from the first magnetic adsorption member 30, and an outer side wall of the second lens 22 is provided with a fourth magnetic adsorption member 60 magnetically adsorbed with the third magnetic adsorption member 50. The inner side wall of the lens barrel 10 is further provided with a fifth magnetic adsorption member 70, and an outer side wall of the third lens 23 is provided with a sixth magnetic adsorption member 80 magnetically adsorbed with the fifth magnetic adsorption member 70. The inner side wall of the lens barrel 10 is further provided with a seventh magnetic adsorption member 90, and an outer side wall of the fourth lens 24 is provided with an eighth magnetic adsorption member 100 magnetically adsorbed with the seventh magnetic adsorption member 90. The first magnetic adsorption member 30, the third magnetic adsorption member 50, the fifth magnetic adsorption member 70 and the seventh magnetic adsorption member 90 are arranged in sequence in the lens barrel 10 from the image side to the object side.

It is understood that the number of lenses is not limited to the four lenses mentioned above. For example, the lens group may also include two (i.e., the lens group 20 merely includes the first lens 21 and the second lens 22) or three (i.e., the lens group 20 includes the first lens 21, the second lens 22 and the third lens 23) or more than four lenses, which is determined according to the actual needs.

Preferably, the first fixing portion 212, the second fixing portion 222, the third fixing portion 232 and the fourth fixing portion 242 are all coated or plated with a black extinction layer for extinction, which can effectively prevent stray light from being generated, and can be specifically prepared by ink coating or blackening treatment.

The description above is merely the embodiments of the present invention, and it should be pointed out that those of ordinary skills in the art may make improvements without departing from the concept of the present invention, and all these improvements shall belong to the scope of protection of the present invention.

What is claimed is:

1. A camera lens, comprising a lens barrel and a lens group accommodated in the lens barrel, wherein the lens group comprises a first lens, an inner side wall of the lens barrel is provided with a first magnetic adsorption member, and an outer side wall of the first lens is provided with a second magnetic adsorption member magnetically adsorbed with the first magnetic adsorption member.

2. The camera lens according to claim 1, wherein the first lens comprises a first optical portion and a first fixing portion arranged on a periphery of the first optical portion, the first magnetic adsorption member is an annular member annularly arranged on the inner side wall of the lens barrel, and the second magnetic adsorption member is an annular member annularly arranged on an outer side wall of the first fixing portion.

3. The camera lens according to claim 2, wherein the inner side wall of the lens barrel is provided with a first annular recess, the first magnetic adsorption member is embedded in the first annular recess, the outer side wall of the first fixing portion is concavely provided with a second annular recess, and the second magnetic adsorption member is embedded in the second annular recess.

4. The camera lens according to claim 1, wherein the second magnetic adsorption member is an annular member annularly arranged on the outer side wall of the first lens; and the first magnetic adsorption member comprises a plurality of first magnetic blocks arranged on the inner side wall of the lens barrel at intervals along a circumferential direction.

5. The camera lens according to claim 4, wherein the inner side wall of the lens barrel is provided with a plurality of first recesses arranged at intervals along the circumferential direction, each first recess is embedded with one of the first magnetic blocks, the outer side wall of the first lens is concavely provided with a second annular recess, and the second magnetic adsorption member is embedded in the second annular recess.

6. The camera lens according to claim 1, wherein the first magnetic adsorption member is an annular member annularly arranged on the inner side wall of the lens barrel; and the second magnetic adsorption member comprises a plurality of second magnetic blocks arranged on the outer side wall of the first lens at intervals along a circumferential direction.

7. The camera lens according to claim 6, wherein the inner side wall of the lens barrel is provided with a first annular recess, the first magnetic adsorption member is embedded in the first annular recess, the outer side wall of the first lens is provided with a plurality of second recesses arranged at intervals along the circumferential direction, and each second recess is embedded with one of the second magnetic blocks.

8. The camera lens according to claim 1, wherein the first magnetic adsorption member comprises a plurality of first magnetic blocks arranged on the inner side wall of the lens barrel at intervals along a circumferential direction, the second magnetic adsorption member comprises a plurality of second magnetic blocks arranged on the outer side wall of the first lens at intervals along the circumferential direction; the inner side wall of the lens barrel is provided with a plurality of first recesses arranged at intervals along the circumferential direction, each first recess is embedded with one of the first magnetic blocks, the outer side wall of the first lens is provided with a plurality of second recesses arranged at intervals along the circumferential direction, and each second recess is embedded with one of the second magnetic blocks.

9. The camera lens according to claim 2, wherein the lens group further comprises at least one second lens arranged on an image side or an object side of the first lens, the second lens comprises a second optical portion and a second fixing portion arranged on a periphery of the second optical portion, the inner side wall of the lens barrel is provided with a third magnetic adsorption member spaced apart from the first magnetic adsorption member along an axial direction of the lens barrel, and an outer side wall of the second fixing portion is provided with a fourth magnetic adsorption member magnetically adsorbed with the third magnetic adsorption member.

10. The camera lens according to claim 9, wherein both the first fixing portion and the second fixing portion are provided with a black extinction layer for extinction.

* * * * *